(12) United States Patent
Owan et al.

(10) Patent No.: US 7,537,541 B2
(45) Date of Patent: May 26, 2009

(54) IMPLICITLY TIMED GEAR BEARINGS

(75) Inventors: Christopher Owan, Tucson, AZ (US); Charles De Lair, Pomerene, AZ (US)

(73) Assignee: Raytheon Company, Waltham, MA (US)

( * ) Notice: Subject to any disclaimer, the term of this patent is extended or adjusted under 35 U.S.C. 154(b) by 402 days.

(21) Appl. No.: 11/279,387

(22) Filed: Apr. 11, 2006

(65) Prior Publication Data

US 2007/0234835 A1    Oct. 11, 2007

(51) Int. Cl.
*F16H 57/08* (2006.01)
(52) U.S. Cl. ...................................... 475/335
(58) Field of Classification Search ................. 475/331, 475/335
See application file for complete search history.

(56) References Cited

U.S. PATENT DOCUMENTS

| | | | |
|---|---|---|---|
| 1,970,251 A * | 8/1934 | Rossman | 475/335 |
| 2,567,482 A * | 9/1951 | Hoffman et al. | 74/432 |
| 2,706,912 A | 4/1955 | Baker | |
| 3,147,629 A | 9/1964 | Michalec | |
| 3,216,270 A * | 11/1965 | Nasvytis | 74/410 |
| 3,583,252 A * | 6/1971 | Shipitalo et al. | 74/399 |
| 4,586,219 A * | 5/1986 | Blach et al. | 24/410 |
| 4,597,488 A * | 7/1986 | Lynch et al. | 198/339.1 |
| 5,195,838 A * | 3/1993 | Katz et al. | 403/5 |
| 5,213,010 A * | 5/1993 | Hayafusa et al. | 74/665 GA |
| 6,093,009 A * | 7/2000 | Jacks, Jr. | 418/201.1 |
| 6,298,751 B1 * | 10/2001 | Ide et al. | 74/665 GA |
| 6,626,792 B2 | 9/2003 | Vranish | |

OTHER PUBLICATIONS

Sharke, Paul, "The Start of a New Movement," Mechanical Engineering Magazine, Aug. 2002, pp. 1-7.

* cited by examiner

*Primary Examiner*—Dirk Wright
(74) *Attorney, Agent, or Firm*—The Noblitt Group, PLLC

(57) ABSTRACT

The disclosed gear bearing systems generally include first and second gear bearings having gear teeth, wherein the gear bearings are coupled together axially and the alignment and position of the gear bearings may be set substantially independently of the alignment and position of their gear teeth.

20 Claims, 2 Drawing Sheets

IMPLICITLY TIMED GEAR BEARINGS

FIELD OF INVENTION

The present invention generally concerns gear bearings; and more particularly, representative and exemplary embodiments of the present invention generally relate to systems, devices and methods relating to gear bearings in planetary gear sets.

BACKGROUND OF INVENTION

Gear bearing systems combine the functions of gears and bearings to allow compact gear sets that provide both functions. Gear bearings may be joined together in a variety of applications, such as in planetary gear bearing systems. In planetary gear bearing systems, gear bearings are arranged to effect drive speed reductions. In such systems, drive speed reduction may be achieved through the use of phase-shifted gear bearings, which are gear bearings coupled together where the gear teeth of one bearing are offset relative to the gear teeth from the other bearing.

There are at least three problems with phase-shifted gear bearings: First, gear teeth must be of a particular configuration to allow meshing. For example, gear teeth on a gear bearing may need to be beveled at the point where they intersect with the gear teeth on another gear bearing such that they mesh properly. Additionally, the gear teeth must be numerically configured with integer ratios in order for proper meshing to occur. That is, the teeth of one gear bearing must be of a uniform ratio to the teeth of the other gear bearing (13:15, 15:16, 33:34, etc.). Finally, since the gear teeth of one gear bearing must exactly intermesh with the gear teeth of another gear bearing in order for a phased gear bearing to operate properly, such systems are susceptible to failure due to improper machining tolerances.

Attempts to increase the packaging density of conventional gear systems have been generally limited to cascaded gear reduction designs or ball screw and linkage designs. These systems may be difficult and/or costly to implement due to issues such as the high degree of precision required in machining and fitting. A conventional phase-shifted gear bearing system reduces the complexity and number of parts, but may place even higher demands on precision.

SUMMARY OF THE INVENTION

In various representative aspects, the present invention provides for systems, devices, and methods for gear bearings. Exemplary features generally include first and second gear bearings having gear teeth, wherein the gear bearings are coupled together axially and the alignment and position of the gear bearings may be set independently of the alignment and position of their gear teeth.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Figure 1:
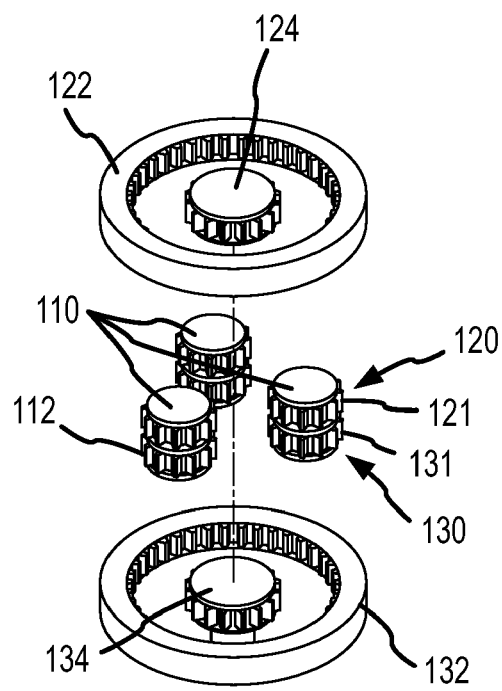
FIG. 1 representatively illustrates an exploded view of a gear bearing system in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the Description and/or in the claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any gear bearing system. A detailed description of an exemplary application, namely a planetary gear set, is provided as a specific enabling disclosure that may be generalized to any application of the disclosed system, device and method for gear bearings in accordance with various embodiments of the present invention.

As used herein, the terms "sun", "planet," "ring" or any variation or combination thereof, are generally intended to include anything that may be regarded as at least being susceptible to characterization as, or generally referring to, a gear bearing element.

Gear bearing systems according to various aspects of the present invention may provide a number of advantages over conventional gear systems in a variety of applications. Gear bearings of the present invention may be implemented at a lower cost while providing higher gear reduction ratios and efficiencies as compared to conventional gear systems. Additionally, the present invention is generally less costly to manufacture and assemble than comparable conventional phase-shifted gear bearings. The present invention may be employed in a wide variety of systems and devices, such as control systems for missile steering and thrust vectoring, factory robotic systems, deployment drives for space arrays, power tools, winches, machine tools, servo drives, automotive transmissions, aircraft control surface actuators, and various systems throughout electric vehicles.

The present invention generally provides inherently high gear ratios at a high efficiency. For example, a gear bearing system according to various aspects of the present invention may provide ten times the gear ratio for the same given volume of conventional gear trains and up to three times the ratio of a comparably-sized conventional compound or cascaded planetary gear train. A gear system according to various aspects of the present invention may be compact enough to allow a motor and gear train to be mounted substantially directly in line with the output shaft of a missile fin without having to redirect the movement of the motor drive in a right angle.

FIG. 1 representatively illustrates an exploded view of a gear bearing system 100 in accordance with an exemplary embodiment of the present invention. As generally depicted in FIG. 1, gear bearing system 100 may be a planetary gear system. However the invention is not limited to a planetary gear system and may include any gear bearing system where gears perform the functions of both gears and bearings.

Gear bearing system 100, according to various aspects of the present invention, may include gear bearings 110 having gear teeth 112 extending radially from gear bearings 110. In this representative embodiment, output planet gear bearings 120 and input planet gear bearings 130 may be coupled together axially. Each of gear bearings 110 may have its own set of gear teeth. For example, output planet gear bearings 120 may have a first set of gear teeth 121 and input planet bearings 130 may have a second set of gear teeth 131.

Input planet gear bearings 130 may interface with gear teeth of input ring 132 and gear teeth of input sun 134. Input planet gear bearings 130 may be coupled to rotate around input sun 134 while in continuous contact with input ring 132. In another embodiment, input ring 132 may be fixed to a structure external to gear bearing system 100.

Output planet gear bearings 120 may interface with gear teeth of output ring 122 and gear teeth of output sun 124. Output planet gear bearings 120 may be coupled to rotate around output sun 124 while in substantially continuous contact with output ring 122.

In another representative embodiment, gear bearing system 100 may operate as follows: Input sun 134 may be coupled to a drive mechanism, for example a drive motor, and the like, which provides input torque to input sun 134. This causes input sun 134 to rotate, which in turn causes input planet gear bearings 130 to rotate around input sun 134, with input ring 132 being fixed to an external, relatively stationary structure. Input planet gear bearings 130 are axially coupled to output planet gear bearings 120 and rotate with the same angular velocity. However, first set of gear teeth 121 of output planet gear bearings 120 may have a different pitch than second set of gear teeth 131 of input planet gear bearings 130. Thus, the rotation of output planet gear bearings 120 cause output sun 124 to rotate at a different angular velocity than input sun 134. Depending on the gear ratios between the input planet gear bearings 130 and output planet gear bearings 120, large gear reductions and changes in transmitted torque may be achieved between input sun 134 and output ring 122. Input ring 132 reacts the torque generated in output ring 122.

Figure 2:
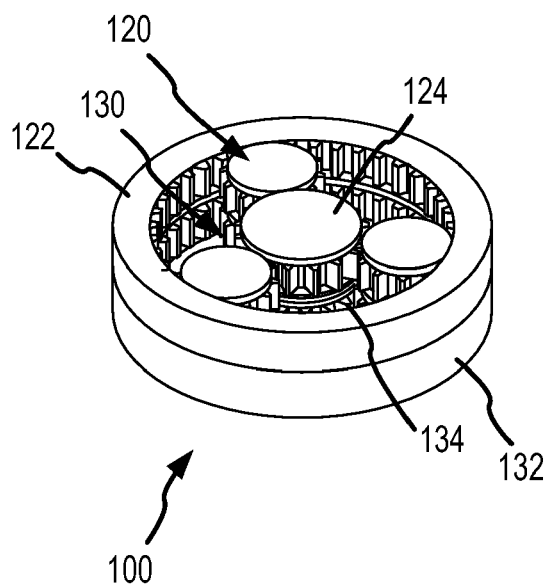
FIG. 2 representatively illustrates a condensed perspective view of the gear bearing system generally depicted in FIG. 1, in accordance with an exemplary embodiment of the present invention.

FIG. 2 representatively illustrates a condensed perspective view of the gear system 100 generally depicted in FIG. 1, in accordance with an exemplary embodiment of the present invention. As depicted in FIG. 2, first set gear teeth 121 of the output planet gear bearings 120 interface with the gear teeth of the output ring 122 and the output sun 124. Similarly, second set of gear teeth 131 of the input planet gear bearings 130 interface with the input ring 132 and the input sun 134.

Figure 3:
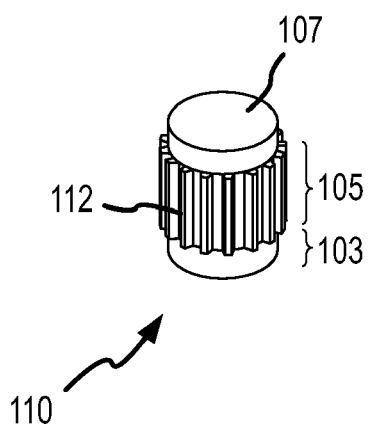
FIG. 3 representatively illustrates a perspective view of a roller-style gear bearing in accordance with an exemplary embodiment of the present invention.

FIG. 3 representatively illustrates a perspective view of a roller-style gear bearing in accordance with an exemplary embodiment of the present invention. The roller-style gear bearing is one representative embodiment of gear bearings 110 of FIG. 1.

In an exemplary embodiment, gear bearing 110 as shown in FIG. 3, may have at least one roller portion 103, a gear portion 105 and an end portion 107. Gear teeth 112 may be spaced substantially equidistantly around the axis of the roller bearing gear bearing 110 and run partially along the length of gear bearing 110, for example in gear portion 105. Gear bearings 110, particularly output planet gear bearings 120 and input planet gear bearings 130 may be axially coupled to each other at end portion 107 such that gear portion 105 of each of output planet gear bearings 120 and input planet gear bearings 130 do not interface, intermesh, and the like. Further, output planet gear bearings 120 may have a first diameter and input planet gear bearings 130 may have a second diameter which may be independent of each other. In a representative embodiment, the first diameter may be different from the second diameter. In another embodiment, the two diameters may be substantially the same.

Gear bearing 110 includes gear teeth 112 that interface the gear teeth of other components in gear bearing system 100 as described above. Gear bearing 110 may include any suitable structures, systems, and devices in any configuration to achieve any suitable purpose. Gear bearing 110 may have any number of gear teeth 112 in any pattern, formation and configuration to achieve any purpose. For example, gear teeth 112 may include crowned, helical, herring bone, straight spur and beveled gear teeth and be within the scope of the invention.

Gear bearings 110 coupled together need not be of the same size, shape, type and/or dimension. Gear bearing 110 may also be constructed in any manner and may include any suitable materials to achieve any purpose. For example, in the present embodiment the gear bearings 110 may comprise a metal alloy that is suitably durable and sturdy for use in a planetary gear arrangement. In addition, gear bearing 110 may include any other suitable material, such as plastics and graphite composites in order to provide benefits such as lower weight and increased heat resistance.

Gear bearing 110 suitably interfaces with other components in gear bearing system 100. The gear bearing 110 may interface with any suitable system, structure, and device for any purpose. The gear bearing 110 may be part of a gear bearing system 100 having any suitable configuration, geometry, and symmetry, such as Cascaded Spur, Cascaded Planetary, Compound Planetary, and Harmonic Drive configurations. The gear bearing system 100 may also include any number of additional parts such as bearings and carriers.

Figure 4:
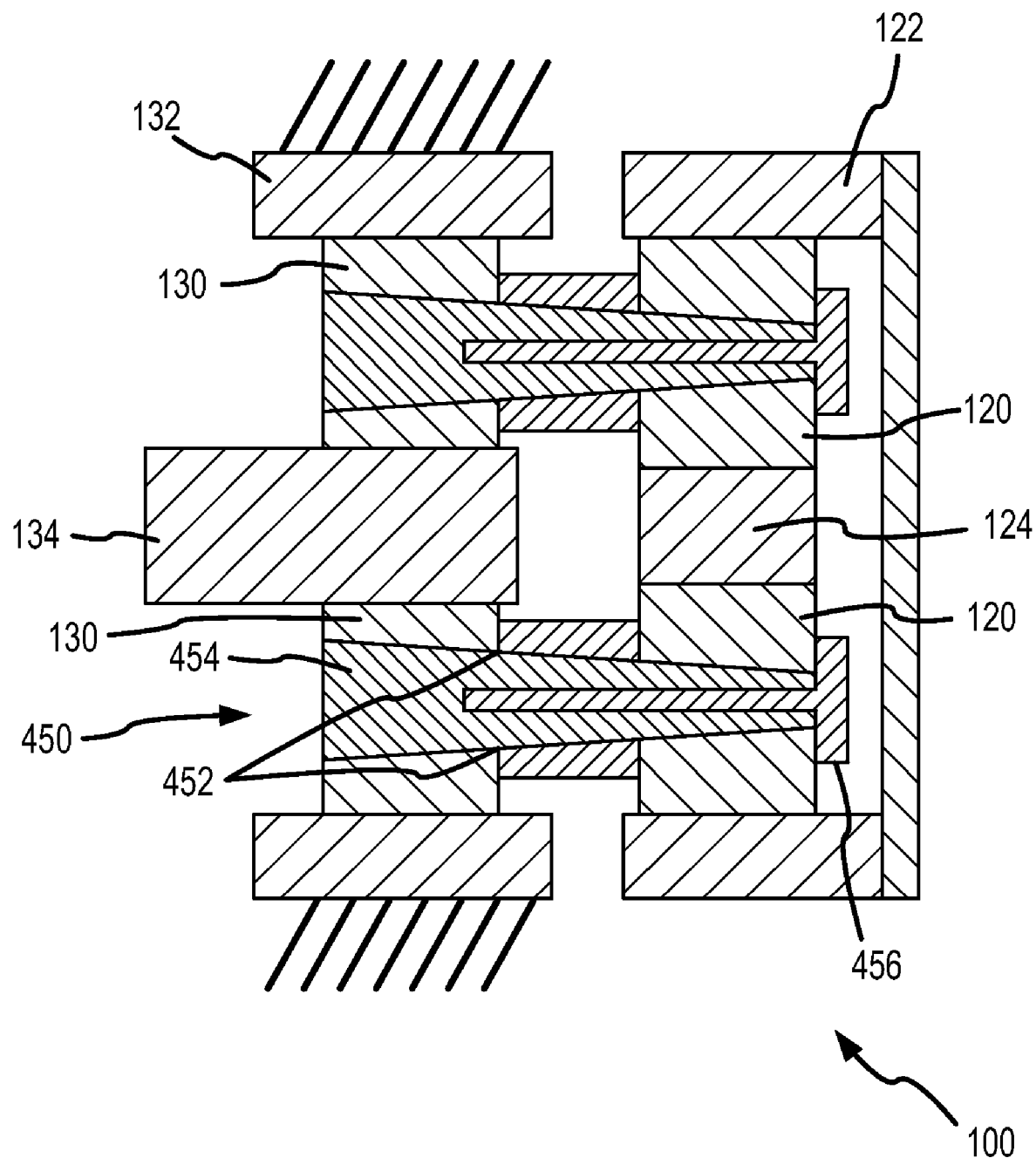
FIG. 4 representatively illustrates a cross-sectional view of gear bearing system in accordance with an exemplary embodiment of the present invention.

FIG. 4 representatively illustrates a cross-sectional view of gear bearing system 100 in accordance with an exemplary embodiment of the present invention. Gear bearings 110 may be coupled together in any suitable manner using any suitable system, structure, and device. In a representative embodiment, for example and without limitation, output planet gear bearing 120 may be coupled to the input planet gear bearing 130 using a machine taper device 450.

In another embodiment, machine taper device 450 may include a truncated conical void portion 452 and a truncated conical shank portion 454. Void portion 452 may be defined by input walls of input planet gear bearing 130 and output planet gear bearing 120 coaxial with the axis of rotation. Shank portion 454 may be substantially uniformly tapered to fit into void portion 452. The pressure of shank portion 454 against the walls of void portion 452 serves to provide friction across the surface of the interface of void portion 452 and shank portion 454. This friction allows the transfer of torque from input planet gear bearing 130 to output planet gear bearing 120.

In another exemplary embodiment, machine taper device 450 may include any amount of taper to fit a particular application. The taper may be varied by varying the diameter at the small end of the truncated cone ("the minor diameter"), the diameter at the large end of the truncated cone ("the major diameter"), and the axial distance between the two ends of the truncated cone. Optionally, machine taper device 450 may include a threaded draw bar portion 456 to help secure shank portion 454 into void portion 452.

There are numerous standardized tapers known in the art. For example, and without limitation, machine taper device 450 may be a Morse Taper, Jacobs Taper, Jamo Taper, Brown & Sharpe Taper, and/or the like.

In the present invention, the use of a machine taper device 450 to attach the gear bearings generally allows the gear teeth of coupled gear bearings to be of any ratio, while conventional phase-shifted gear bearing systems require the number of gear teeth on coupled gear bearings to be equal or otherwise numerically related. The machine taper device 450 may also allow gear bearings to be coupled together more cheaply than other conventional methods. Furthermore, the machine taper device 450 is simple and convenient to produce and provides a secure and flexible means of coupling gear bearings. For example, the machine taper device 450 allows for adjustment at the time of assembly such that high precision in the timing of the gear bearings can be attained and measured despite manufacturing tolerances, while the accuracy of conventional gear bearings is generally much more dependent on manufacturing tolerances. Gear bearings coupled using the machine taper device 450 can also be assembled in multiple configurations and in an automated manner.

The machine taper device 450 suitably attaches gear bearings 110 together in any suitable manner for any purpose. In the present embodiment, for example, the machine taper device 450 allows the gear teeth 112 of the gear bearings 110 to be positioned in any suitable alignment prior to coupling in order to set the relative the timing of the gear bearings 110 in the gear bearing system 100. Once the proper gear alignment is determined, the machine taper device 450 is engaged in order to hold the gear bearings 110 together so that they do not shift during operation. The machine taper device 450 may provide any number of advantages over alternate methods and systems for coupling the gear bearings 110. For example, the machine taper device 450 may allow accurate alignment of the gear bearings 110 while not requiring an external locking device to couple the gear bearings 110 together.

In an embodiment of the present invention, the alignment of two gear bearings 110 coupled together axially is independent of the number of gear teeth 112 on each gear bearing 110, as well as the relative position of the gear teeth 112. In this embodiment, the gear teeth 112 on the gear bearings 110 need not be numerically related, nor do the gear teeth necessarily need to align in any particular way for the coupled gear bearings 110 to function properly in gear bearing system 100. In other words, the gear teeth 112 of input planet gear bearings 130 may be independently positioned relative to the gear teeth 112 of output planet gear bearings 120.

Non-numerically related gear bearings 110 may be realized where the teeth of one gear bearing are not a uniform integer ratio to the teeth of the other gear bearing (13:15, 15:16, 33:34, etc.). For example, the present invention allows non-numerically related gear teeth 112 between input planet gear bearings 130 and output planet gear bearings 120. The gear bearings 110 may also be positioned and coupled using the machine taper device 450 for any purpose, such as to adjust for machining tolerances in the construction of the gear bearing 110.

In a representative embodiment, any other suitable system, mechanism, process, and device may be used to couple the gear bearings 110, such as a weld (including laser welds, inertia welds, and electron beam welds), a match drill and pin assembly, a spline or keyed interface, a curvic or face coupling, a fastener, a shrink fit assembly, a press fit assembly, and the like. Any method of axially coupling input planet gear bearing 130 to output planet gear bearing 120, where the gear teeth 112 of each respective gear bearing do not have to intermesh and may be non-numerically related, shall be understood to be within the scope of the present invention.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprising", "having", "including" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A gear bearing system comprising:
   a first gear bearing having a first set of gear teeth; and
   a second gear bearing having a second set of gear teeth, wherein the second gear bearing is coupled to the first gear bearing and the first set of gear teeth are independently positioned in relation to the second set of gear teeth.

2. The gear bearing system of claim 1, wherein the first gear bearing is coupled to the second gear bearing via a machine taper device.

3. The gear bearing system of claim 2, wherein the machine taper device comprises:
   a truncated conical void portion of the first gear bearing and the second gear bearing; and
   a truncated conical shank portion, wherein shank portion is substantially uniformly tapered to frictionally engage said void portion.

4. The gear bearing system of claim 2, wherein the machine taper device comprises a Morse Taper.

5. The gear bearing system of claim 1, wherein coupling of the second gear bearing to the first gear bearing is achieved using at least one of a weld, a match drill and pin assembly, a spline, a keyed interface, a curvic coupling, a face coupling, a shrink fit assembly, a press fit assembly, and a fastener.

6. The gear bearing system of claim 1, wherein the first set of gear teeth is numerically independent from the second set of gear teeth.

7. The gear bearing system of claim 1, wherein a relative position of the first and second gear bearings is suitable for setting a gear timing ratio.

8. The gear bearing system of claim 1, wherein the first gear bearing and second gear bearing are axially coupled.

9. The gear bearing system of claim 1, wherein the first gear bearing and the second gear bearing are roller bearings having a first diameter and a second diameter respectively.

10. The gear bearing system of claim 9, wherein the first diameter is independent of the second diameter.

11. A method for timing a gear bearing system, said method comprising the steps of:
    providing a first gear bearing having a first set of gear teeth;
    providing a second gear bearing having a second set of gear teeth;
    disposing the first gear bearing in relation to the second gear bearing, wherein the first set of gear teeth are independently positioned from the second set of gear teeth; and
    coupling the first gear bearing to the second gear bearing.

12. The method of claim 11, wherein said coupling comprises a machine taper device coupling the first gear bearing to the second gear bearing.

13. The method of claim 12, wherein the machine taper device coupling comprises:
    providing a truncated conical void portion in the first gear bearing and the second gear bearing; and
    providing a truncated conical shank portion frictionally engaging the void portion, wherein shank portion is substantially uniformly tapered to frictionally engage void portion.

14. The method of claim 12, wherein the machine taper device is a Morse Taper.

15. The method of claim 11, wherein the coupling of the second gear bearing to the first gear bearing is achieved using at least one of a weld, a match drill and pin assembly, a spline, a keyed interface, a curvic coupling, a face coupling, a shrink fit assembly, a press fit assembly, and a fastener.

16. The method of claim 11, wherein the first set of gear teeth is numerically independent from the second set of gear teeth.

17. The method of claim 11, wherein the first gear bearing and second gear bearing are axially coupled.

18. The method of claim 11, wherein orienting the first and second gear bearing suitably configures a gear timing ratio.

19. The method of claim 11, wherein the first gear bearing and the second gear bearing are roller bearings having a first diameter and a second diameter respectively.

20. The method of claim 19, wherein the first diameter is independent of the second diameter.

* * * * *